United States Patent [19]

Kinsell et al.

[11] 4,352,273
[45] Oct. 5, 1982

[54] FLUID CONDITIONING APPARATUS AND SYSTEM

[75] Inventors: Robert C. Kinsell, Los Angeles; Michael P. Saba, Huntington Beach; James E. Strang, Fountain Valley, all of Calif.

[73] Assignee: The Garrett Corporation, Los Angeles, Calif.

[21] Appl. No.: 41,451

[22] Filed: May 22, 1979

[51] Int. Cl.³ .............................. F25B 9/00; F28F 3/00
[52] U.S. Cl. .......................................... 62/87; 138/32; 165/166
[58] Field of Search .................. 62/87, 401, 402, 403, 62/283, 93, 172; 165/134 DP

[56] References Cited

U.S. PATENT DOCUMENTS

| | | | |
|---|---|---|---|
| 1,914,604 | 6/1933 | Keenan, Jr. et al. | 165/134 DP X |
| 2,077,315 | 4/1937 | Ewing et al. | 62/93 X |
| 2,453,923 | 11/1948 | Mayo | 62/402 X |
| 2,585,570 | 2/1952 | Messinger et al. | 62/402 |
| 2,602,307 | 7/1952 | Collison | 62/401 |
| 2,614,815 | 10/1952 | Marchant et al. | 62/283 |
| 2,829,505 | 4/1958 | Oates, Jr. | 62/401 X |
| 2,835,340 | 5/1958 | McGuff et al. | 62/93 X |
| 2,902,836 | 9/1959 | LeMay et al. | 62/172 |
| 2,979,916 | 4/1961 | Mason | 62/172 X |
| 3,093,470 | 6/1963 | Melikian et al. | 62/402 X |
| 3,165,903 | 1/1965 | Roc et al. | 62/93 X |
| 3,226,948 | 1/1966 | Alderson et al. | 62/317 |
| 3,587,243 | 6/1971 | Keller | 62/402 X |
| 3,623,332 | 11/1971 | Fernandes | 62/402 X |
| 3,877,246 | 4/1975 | Shutze | 62/402 |
| 4,198,830 | 4/1980 | Campbell | 62/87 |
| 4,246,963 | 1/1981 | Anderson | 165/166 |

FOREIGN PATENT DOCUMENTS 2015723  9/1979  United Kingdom ................ 62/87

Primary Examiner—Daniel M. Yasich
Attorney, Agent, or Firm—Orville R. Seidner; Joel D. Talcott; Albert J. Miller

[57] ABSTRACT

Working fluid from a source thereof and which is to be conditioned in heat exchangers and fluid conditioning means is admitted lastly to the passageways of a heat exchanger and to a bypass around the passageways to provide to the point of use a fluid from the passageways in a final condition tempered by the bypassed fluid.

17 Claims, 5 Drawing Figures

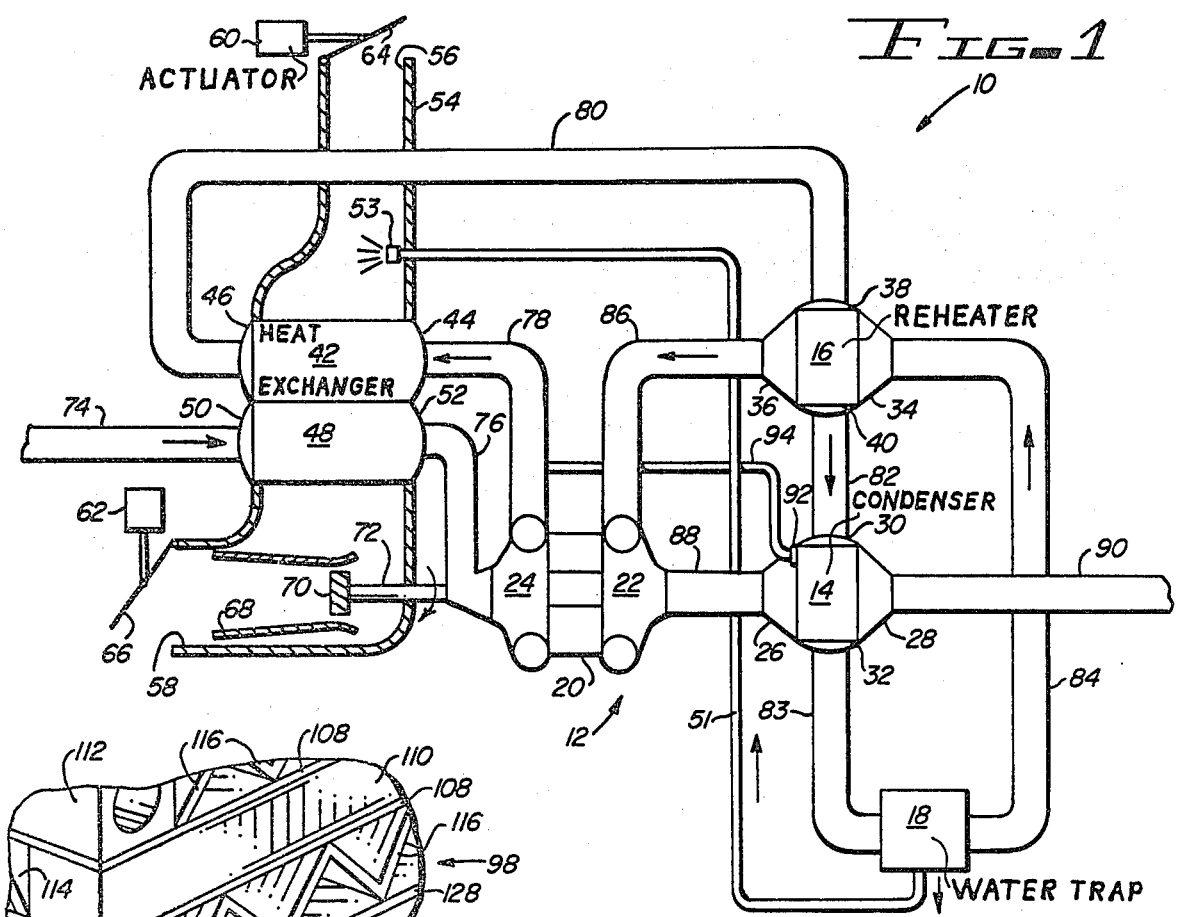

FLUID CONDITIONING APPARATUS AND SYSTEM

BACKGROUND OF THE INVENTION

1. Field of the Invention

This invention pertains to the art of fluid conditioning apparatus, systems and methods, and is more particularly concerned with improved elastic fluid conditioning apparatus, systems and methods, such as those required to meet the physiological air requirements of passenger aircraft, although not limited thereto since the concept may be employed in other areas of the art.

2. Description of the Prior Art

The most typical exposition of the prior art is to be found in two applications for Letters Patent, one of which is No. 921,660, filed July 3, 1978, on an invention by Carl D. Campbell, and entitled "Fluid Conditioning System and Apparatus" now U.S. Pat. No. 4,198,830 dated Apr. 22, 1980. The other is No. 955,273, filed Oct. 26, 1978 on an invention by Alexander Anderson entitled "Heat Exchanger", now U.S. Pat. No. 4,246,963 issued Jan. 27, 1981. Both said applications are assigned to the same assignee as that of the present application.

Briefly stated, the disclosure of the Campbell application is directed to apparatus and a system in which fluid to be conditioned is admitted to first passageways of a heat exchanger and thereafter to a point of use, traversing flow conducting means which include the second passageways of a heat exchanger and fluid conditioning means which reduces the energy level of the fluid admitted to the second passageways below the energy level of the fluid admitted to the first passageways so as to increase the energy level of the fluid flowing through the second passageways by heat exchange with the fluid flowing through the first passageways.

The Campbell apparatus and system provides a very distinctive feature in the case of pressurized elastic fluids, in that moisture or other condensation entrained in the fluid in evaporated or mist form at the source, is readily condensed while the fluid is still in pressurized condition, and thus removable by a condensate separator without the requirement for a coalescer bag which is a source of a serious maintenance problem in the case of aircraft. The apparatus proved to be highly successful in removal of a very substantial portion of water from aircraft ventilation air conditioning systems.

One nuisance problem introduced by the component arrangement of the Campbell invention, when operating under some extreme conditions, occurred at the entrance to the last heat exchanger passageways in the flow path between the expansion turbine and the point of use. Over a period of operating time, ice would build up on the header bar and tend to block the flow of working fluid. It was deduced that although the upstream water separator removed substantially all of the air moisture, the remaining moisture would be transformed into ice particles or snow in the expansion turbine, and which would gradually accumulate and build up as ice at the header bars at the inlets of those last heat exchanger passageways. It was then conceived as disclosed in the aforesaid Anderson application, that if the header bars were provided with heater means, the accretion of the ice thereat would be prevented.

In connection with the present invention, it was conceived also that the air compressor discharge would provide an ideal source of heat which would then entail a minimum penalty to the system since only modest amounts of heat would be needed. Accordingly, the arrangement conceived resulted in the aforesaid Anderson invention.

Both said Campbell and Anderson inventions have proven to have important utility in applications to present day aircraft. However, the industry is highly competitive and cost conscious from standpoints of both initial capital investment and ongoing operating and maintenance expenditures. Hence in assessing the requirements for the next generation transport aircraft a very important factor considered by airframe manufacturers is the aircraft fuel penalty of the various systems and subsystems comprised in the final design. This is particularly so because of the present energy crisis coupled with the increasingly high cost of the fuel required in all phases of aircraft preparation for flight and the flight itself.

With this in mind, the inventors of the apparatus and system of the present application reasoned that the Campbell and Anderson inventions would form the most logical basis upon which to develop improvements to achieve the economies desired in the areas of fuel usage and maintenance costs without incurring penalties in other areas. As will be seen below the target was achieved by examining the following equation which forms the basis for calculating cabin refrigeration capacity:

$$Q = W_1 C_p (T_{cabin} - T_1 \text{ supply})$$
$$= W_2 C_p (T_{cabin} - T_2 \text{ supply})$$

wherein:
- $Q$ = refrigeration capacity in BTU/per minute
- $W_1$ = flow rate into the cabin in pounds per minute
- $C_p$ = specific heat of the air (about 0.24 at 40° F.)
- $T_{cabin}$ = the temperature desired for the cabin (°F.)
- $T_1$ supply = temperature of the air supplied from the system (°F.)
- $W_2$ = flow rate into the cabin in pounds per minute
- $T_2$ supply = temperature of the air supplied from the system (°F.)

Briefly stated, the problem is to lower the temperature $T_2$ to a significant figure below $T_1$, from which $W_2$ can be reduced significantly below $W_1$.

SUMMARY OF THE INVENTION

Accordingly, the invention has for its general object an improved system with improved apparatus for fluid conditioning, with the apparatus coupled between a working fluid source and the point of use of the conditioned fluid. In contemplation of the general object is an improved system of apparatus which provides greatly increased fluid temperature change, thereby reducing the flow rate but providing the same fluid conditioning capacity of apparatus of the prior art. Another object in connection with fluid temperature change for aircraft air-conditioning systems is increased transient cooling capacity with the same steady state refrigeration capacity of apparatus of the prior art, thereby achieving faster "pull down time", which means less time required to obtain a comfortable cabin. If an APU (auxiliary power unit) is used as a bleed source for the ventilation air conducted to the inlet of the air-conditioning unit, it means less fuel consumed by the APU since APU operation time is reduced. Also, the life of the APU in terms of calendar time is increased.

Laboratory demonstration tests, in a test setup organized according to the present invention, have shown that air supply temperatures lower than 15° F. can be achieved, as compared to the usual minimum air supply temperature of about 35° to 40° F. This air supply temperature of 15° F. results in about 40% reduction in bleed air flows to obtain the capacity required to hold the cabin temperature at 75° F.

An important object of the invention is an improvement of the apparatus (and system using the apparatus) in which the working fluid traverses a passageway means of a heat exchange means as a last conditioning element prior to being conducted to the point of use of the working fluid. It is a specific object to reduce the fluid temperature differential as between the inlet and outlet of the passageway means so that the temperature of the fluid supplied to the point of use is closer to that of the fluid supplied to the heat exchange means upstream of the passageway means.

Other and further objects will be apparent at once to those skilled in the art upon consideration of the drawings in connection with the description thereof herein told.

BRIEF DESCRIPTION OF THE DRAWINGS

FIG. 1 is a system schematic of one refrigeration pack of components for an air-conditioning system in a transport aircraft, employing the novel invention herein disclosed;

FIG. 2 is a perspective view, with a portion cut away, of one embodiment of heat exchange means having structure to practice the invention;

FIG. 2A is an enlarged fragmentary view of a portion of FIG. 2, taken on the line 2A;

DESCRIPTION OF THE PREFERRED EMBODIMENT

Figure 3:
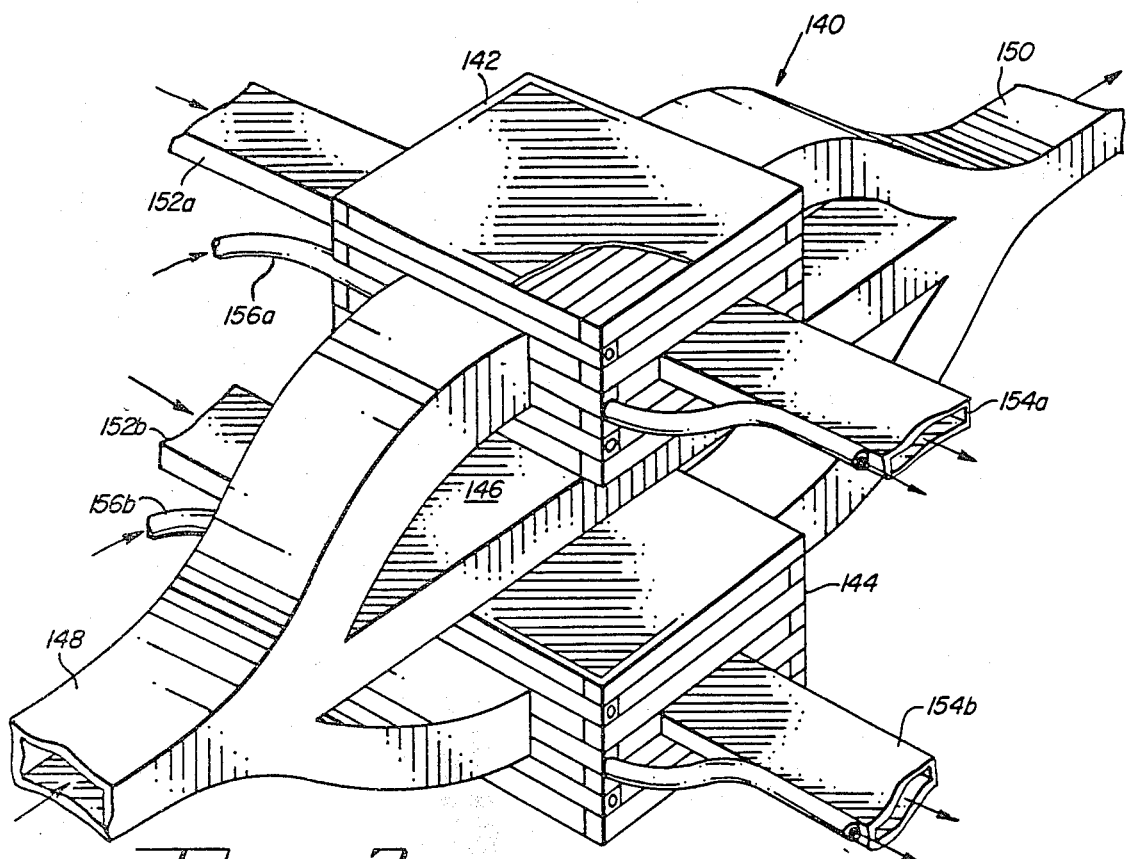
FIG. 3 is a highly schematic perspective illustration of the heat exchange means of FIG. 2.

One form of the apparatus of the invention, and one form of the system employing the apparatus, is illustrated on FIG. 1 wherein the system 10 for the conditioning of the air supplied from a source (not shown), as, for example, an auxiliary power unit on a ground cart or on the aforesaid transport aircraft to a point of use (also not shown), as, for example, the cabin of the aircraft, employs an apparatus 12 comprised of a first heat exchange means 14, a second heat exchange means 16, a water trap or separator 18 and an ACM (air cycle machine) 20. The machine 20 is of the three-wheel type well known in the art, comprising an air expansion turbine 22 and a centrifugal type air compressor 24 with the turbine and the compressor wheels mounted on a common rotatable shaft, together with a fan wheel which will be described in detail hereinbelow.

The heat exchange means 14 in its preferred form is of the type familiarly known in the art as a cross-flow-plate-fin device having fin means (not shown on FIG. 1) defining a first fluid passageway means separated by plate means (also not shown on FIG. 1) from a second passageway means defined by cross-flow-disposed fins (also not shown). Fluid flowing from a chamber defined by the plenum casing 26 through the first passageway means enters a chamber defined by a plenum casing 28 after having been in heat exchange relationship with fluid flowing through the second passageway means from a chamber defined by the plenum casing 30 and entering a chamber formed by rhe plenum casing 32. Those skilled in the art will immediately recognize that the structure of the cross-flow-plate-fin-device mentioned hereinabove finds an equivalence in the embodiment depicted in FIGS. 2 and 2A, described in detail hereinbelow.

The heat exchange means 16 is similar to the heat exchange means 14, having similar means forming third and fourth passageway means for fluids in heat exchange relationship. Fluid flowing from a chamber defined by the plenum casing 34 through the third passageway means enters a chamber defined by the plenum casing 36. Similarly, fluid flowing from a chamber defined by the plenum casing 38 through the fourth passageway means enters a chamber defined by the plenum casing 40.

A third heat exchange means 42, commonly designated as a secondary heat exchange which is also preferably of the plate-fin type defines a fifth passageway means for the flow of fluid from a chamber defined by the plenum casing 44 through the fifth passageway means to the chamber defined by the plenum casing 46. The flow path over the fifth passageway means defines a sixth passageway means of the heat exchange means 42.

A fourth heat exchange means 48, commonly designated as a primary heat exchanger, which is likewise of the plate-fin type, defines a seventh passageway means for the flow of fluid from a chamber defined by the plenum casing 50 through the seventh passageway means to the chamber defined by the plenum casing 52. The flow path through the seventh passageway means defines an eighth passageway means of the heat exchange means 48.

A duct 54 defines a passageway for coolant fluid admitted at the upper end 56 and discharged at the lower end 58 thereof. Positioning actuators 60 and 62 are coupled to door type valves 64 and 66, respectively, positioned at the entrance end 56 and the discharge end 58, respectively, of the duct 54. As used in aircraft, the duct 54 would be disposed to conduct coolant ram air from ambient through the sixth and eighth passageways of the heat exchange means 42 and 48.

Forced flow of the ambient coolant air flow through the duct 54 when the ram effect is insufficient (as, for example, with the aircraft stationary on the ground) is achieved by jet pump means comprising a jet pump jacket 68 disposed within the duct 54, preferably downstream of the heat exchange means 42 and 48. A fan wheel 70 disposed on the outboard end 72 of the output power shaft of the air cycle machine 20 serves to move the air through the jacket 68 and thereby pump the air from the inlet end 56 through the outlet end 58 of the duct 54 in known fashion, causing cooling air to flow through the said sixth and eighth passageways of the heat exchange means 42 and 48, respectively, in heat exchange relationship to the hotter working fluid in the said fifth and seventh passageways.

To enhance the cooling effect of the cooling air flowing through the duct 54, water evaporation means therein may be employed. To this end there is provided a water conducting pipe 51 whose inlet is coupled to the trap 18 to conduct water therefrom to a supply nozzle 53 disposed in the duct 54 upstream from the cooling passes of the heat exchanger means 42 and 48.

Working fluid from the exterior source (and which may be initially pressurized thereat) is caused to enter the system 10 through an inlet duct 74, through plenum casing 50, and thence into the seventh passageway means of the fourth heat exchange means 48, and thereafter through a duct 76 to the inlet of the compressor 24. From the exhaust of the compressor, the air, which has been compressed and heated even more therein, is conducted by a duct 78 to the fifth passageway means of the heat exchange means 42 and thence through plenum casing 46 and duct 80 to a heat exchange means 16.

It will be seen that the source working air which reaches this point of the plenum casing 38 of the heat exchange means 16 has been cooled in the heat exchange means 48, heated by the compressor 24 and then cooled in the heat exchange means 42, substantially to the extent of the amount of the heat of compression imparted thereto by the compressor 24. The heat exchange means 16 may also be designated as a reheater means since the pressurized hot source air entering the fourth passageway means thereof gives up heat to the fluid flowing through the third passageway means thereof. The cooled high pressure air is thereafter conducted by a duct 82 to the inlet of the plenum casing 30 and thence into the second passageway means of the first heat exchange means 14 wherein further cooling occurs by the fluid flowing in the first passageway means thereof. At this point a condensation of the water (entrained in vapor form in the source air) occurs. Thus, the first heat exchange means 14 also may be designated as a condenser means.

The cooled air and entrained water droplets and mist then flow through a duct 83 from the condenser means 14 to the water trap or separator 18 wherein substantially or nearly all of the condensed water is removed, with the dry air then flowing through a duct 84 to the inlet of the plenum casing 34 and thence into the third passageway means of the reheater means 16 where it is again heated by the hot source fluid in the fourth passageway thereof, as aforesaid. From the third passageway means the hot fluid flows through a duct 86 to the inlet of the expansion turbine 22 where it is expanded and cooled to a point consistent with the energy imparted by the turbine 22 to the compressor 24 and the fan wheel 70. As will be apparent to those skilled in the art, the turbine and compressor operate in what is familiarly known as boot strap fashion.

From the outlet of the turbine 22 the cooled air is conducted by a duct 88 to the plenum casing 26 of the condenser 14 wherein the air flows through the said first passageway means to the chamber within the plenum casing 28 and into a duct 90 to thereafter be conducted to the point of usage as, for example, the cabin air distribution system of the aforesaid passenger aircraft. Cold air in the first passageway means extracts such heat from the working fluid in the second passageway means as may be necessary to effect the condensation of water in the second passageway means as aforesaid.

It is now apparent that the apparatus 12 as described thus far is essentially that of the prior art exemplified by the disclosure in the copending Campbell application for Letters Patent alluded to hereinabove. Additionally, structure which adds to that of the Campbell application is depicted on FIGS. 1 and 2 which is essentially that of the prior art exemplified by the disclosure in the copending Anderson application for Letters Patent, also alluded to hereinabove.

Heat exchange means, or condenser 14 of the present application is provided with a pipe coupling fixture 92 (FIG. 2) adapted to be coupled with one end of a pipe 94 (FIG. 1) whose other end is coupled to the duct 78 to convey hot compressed air from the compressor 24 to the chamber defined by the plenum casing 96 (FIG. 2) through which the pipe fixture 92 communicates. As noted hereinabove the condenser 14 is preferably of the familiar cross-flow-plate-fin type, comprising in the present embodiment of a core divided into two identical core elements 98 and 100 (FIG. 2) which are spaced apart so as to define a passageway means 102 having side walls 104 and 106. In a preferred embodiment, the fluid flow capacity of the passageway means 102 is up to about one-half that of the combined flow capacities of the core elements 98 and 100.

Each of the core elements 98 and 100 comprises a plurality of plates 108, (FIG. 2A), alternately spaced apart by header bars 110 and 112. Intermediate the plates 108 are fins 114 and 116 with the lengthwise span of the fins 114 and 116 extending in the same direction as the header bars 110 and 112, respectively. The fins 114, together with neighboring surfaces of the plates 108 and the neighboring header bars 110, provide the said first passageway means between the chambers defined by the plenum casings 26 and 28, respectively. The fins 116, together with neighboring surfaces of the plates 108 and the neighboring header bars 112, provide the second passageway means between the chambers 30 and 32, respectively.

The upper and lower external surfaces of the vertices of the triangular-shaped fins may be secured to the plate surfaces by brazing or any other preferred means. While the fin means 114 and 116 have been depicted to be of substantially triangular section having apex contact with the plates 108, 126 and 128, it will be understood that fin means of any other suitable configuration may be employed.

A fitting 118 is provided in the wall of the casing 26 to accept a mating fitting (not shown) of the duct 88 to conduct expanded cold air from the turbine 22 into the chamber (defined by the plenum casing 26 of FIG. 1) at the upstream end of the said first passageway means. A similar fitting (not shown, but designated by the dashed line 120) provided in the wall of the casing 28 accepts a mating fitting (not shown) on the inlet end of the duct 90 to conduct fluid from the chamber (defined by the plenum casing 28 of FIG. 1) at the downstream end of the said first passageway. A fitting 122 is provided in the wall of the casing 30 to accept a mating fitting (not shown) of the duct 82 to conduct fluid flow from the said fourth passageway means of said reheater 16 to the said second passageway means of said condenser 14. A fitting 124 is provided in a formed portion of the wall of the casing 32 to accept a mating fitting (not shown) of the duct 83 to conduct fluid flow from the said second passageway means of said condenser 14 to the water trap 18, and thence via a duct 84 to the said third passageway means of said reheater 16.

It will be observed that the header bars 112 are hollowed to provide passageway means from one end of each of the bars in communication with the chamber formed by the plenum casing 96 to the other end of each of the bars so that heated air from the compressor 24 provides heating of the bars 112 to prevent iceing at the entrance to the said first passageway means, the air thereafter exiting from the hollow header bars into the chamber formed by the plenum casing 32 to mix therein with the cooled air flowing from the said second passageway means. This structural arrangement of heated header bars is that which was disclosed in the aforesaid Anderson application for Letters Patent.

The present application is directed to the very important concept of providing a bypass around the said first passageway of at least a portion of expanded and cold air furnished at the discharge of the turbine 22 to be conducted to the point of use. It has been discovered that if about one-third of the total air flow is directed through a bypass duct, the requirements for one problem statement are met or exceeded. The requirements for heat exchange on the second passageway to provide condensation can still be met with bypass on the first passageway.

This could not have been done in the prior art with the same apparatus but without a bypass and still provide air from the first passageway at temperatures below freezing. The bypass allows proper water removal while still providing sub-freezing supply air.

In the course of developing the aforesaid concept it was found that the bypass duct means and the heat exchange means could be contained within the same heat exchange enclosure, preferably with the heat exchange means divided into the two core elements 98 and 100 and the bypass duct disposed between the elements. This configuration is illustrated on FIG. 2 with the bypass duct shown as comprising the previously mentioned passageway means 102 defined by the sidewalls 104 and 106 and the lower and upper plates 126 and 128 of core elements 98 and 100, respectively.

The orientation and relationship of the various elements and components of the condenser 14 of FIGS. 1, 2 and 2A are more clearly understood by reference to the schematic representation of FIG. 3. On that figure the reference numeral 140 designating the heat exchange means corresponds to the numeral 14 of FIGS. 1 and 2. Similarly, the schematic core elements 142 and 144 correspond to the elements 98 and 100, respectively, of FIGS. 1 and 2, and the bypass passageway means 146 is the equivalent of the bypass passageway means 102 depicted on FIGS. 2 and 2A.

The duct 88 of FIG. 1, which feeds expanded air from the turbine 22 through the plenum casing 26 into the chamber, to direct the air through the first passageway means of the first heat exchange means 14 and through the bypass duct, has its equivalent structure designated by the reference numeral 148 on FIG. 3, while the duct 90 which conducts the air from the first passageway means and the bypass duct to the point of use, has its equivalent structure designated by the reference numeral 150. The duct 82 of FIG. 1, which feeds the warm air from the fourth passageway means of the second heat exchange means 16 of FIG. 1 to the second passageway means of the first heat exchange means 14, is schematically depicted on FIG. 3 as the split duct means 152a and 152b. Correspondingly, the split duct means 154a and 154b schematically depicted on FIG. 3, correspond to the duct 83 of FIG. 1.

The pipe 94 of FIG. 1 has its schematic equivalence in the pipes 156a and 156b to conduct hot compressed air to the upstream hollow headers of the heat exchanger core elements 142 and 144 of FIG. 3.

It should be noted that the positioning of the bypass duct as described in connection with those depicted on FIGS. 2 and 3, is only a preferred embodiment thereof and not to be limited thereto, since in a test set up of components to confirm the concept involved, the bypass duct means was so structured as to carry the bypass air in duct means disposed exteriorly of the heat exchange means. It will also be evident to those skilled in the art that flow control valve means could be disposed in the bypass (or in the parallel first passageway means) to control the working fluid flow therethrough, if desired.

Another discovery was that not always was it necessary to extract hot air from the compressor output in order to warm the header bars 112 for anti-icing purposes. In laboratory testing it was discovered that for the system configured with the split flow occurring by reason of the bypass duct disposition between the two heat exchange elements 98 and 100, the system would run for hours at a time with no hot air from the compressor in the hollow header bars 112, and the core elements 98 and 100 still did not ice sufficiently to cause a problem of freezing on the high pressure side.

The reason for this is very simple. As the ice tends to collect on the core face, the pressure drop through the core (first passageway means) increases, diverting more air through the bypass. Of course this means less cold air will traverse the core. With the same flow of warm air on the other side (second passageway means), the reduced amount of cold air (first passageway means) is warmed to a higher temperature, but the output cold air mix varies only two or three degrees when operating at designed conditions.

Figure 4:
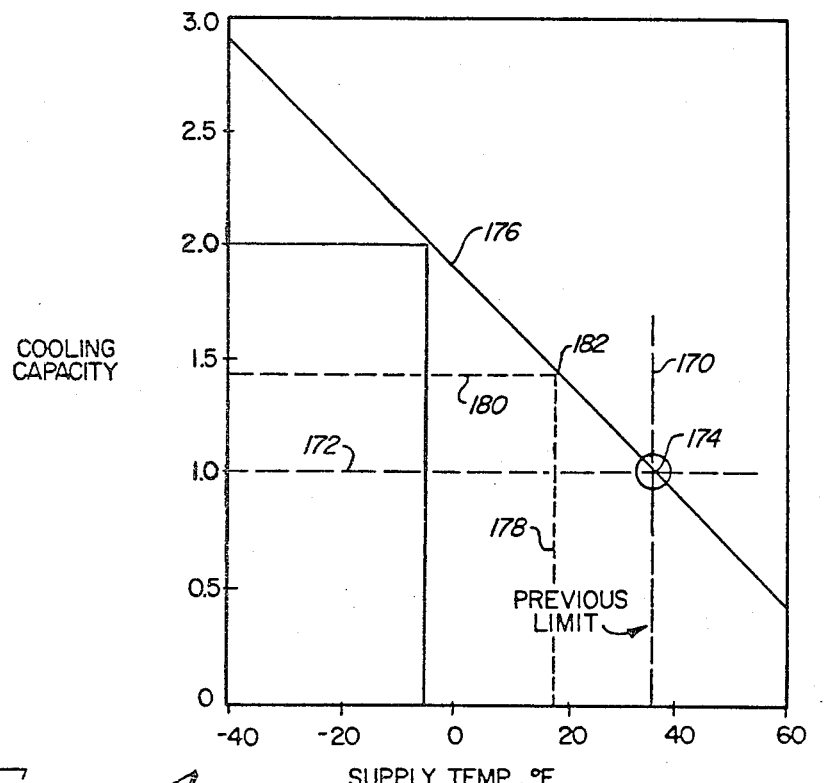
FIG. 4 is a graphic illustration of the relationship between fluid supply temperature and cooling capacity.

A stated object of this application is increased cooling capacity of a system utilizing the same refrigeration capacity of the prior art. In this connection the increase of cooling capacity with a decrease of the supply air temperature is depicted on FIG. 4. The dashed line 170 extends from the abscissa at about the 35° F. point which is the previous lower limit of supply air temperature. The dashed line 172 which extends from the ordinate at the cooling capacity point of 1.0, intersects the line 170 at the point 174 which lies on the line 176 whose slope is derived from the equation for cooling capacity Q alluded to herein above.

It is now apparent that relatively minor decreases of supply air temperature can result in relatively large percentage increases of cooling capacity from the same refrigeration capacity. For example, if the supply temperature can be lowered to about 18° F., the cooling capacity increases by about 40%, as seen from dashed lines 178, 180 intersecting at the point 182 on line 176. It is also apparent now to those skilled in the art that the concept of bypassing a portion of the air, normally flowing through the first passageway means, by way of a bypass duct means, is an important means for lowering the supply temperature of air and thereby achieving a lower temperature supply of air to the cabin.

We claim:

1. Fluid conditioning apparatus defining a fluid flow path for working fluid from a source thereof to a point of use, comprising:
    (a) fluid energy conditioning means having fluid inlet means for working fluid and fluid discharge outlet means for conditioned fluid;
    (b) fluid supply conduit means coupling said inlet means to a source of working fluid;
    (c) heat exchange means comprising heat exchange element means defining first and second fluid passageway means thereof and arranged for heat exchange between the fluids therein;
    (d) first duct means coupling one end of said first passageway means to said discharge outlet means of said fluid energy conditioning means;

(e) second duct means coupling the other end of said first passageway means to a point of use for said working fluid;

(f) bypass duct means coupling said one end of said first passageway means to said other end thereof to provide a bypass passageway means around said first passageway means for fluid admitted thereinto at said one end thereof, said bypass duct means disposed intermediate said heat exchange element means to form a part of, and integral with, said heat exchange means; and (g) heater means disposed adjacent said one end of said first passageway means of said heat exchange element means, said heater means defining tubular passageway means having working fluid inlet means coupled to said fluid supply means.

2. The apparatus of claim 1 in which said fluid energy conditioning means comprises fluid energy extraction engine means.

3. The apparatus of claim 2 in which said fluid energy extraction engine means comprises:
(a) turbine means having shaft power output means; and
(b) energy absorption means coupled with said shaft power output means to absorb the energy extracted from the working fluid by said turbine means, said energy absorption means being disposed in the fluid flow path intermediate the working fluid source and said turbine means.

4. The apparatus of claim 3 for use with gaseous working fluid in which said turbine means comprises elastic fluid expansion turbine means.

5. The apparatus of claim 4 in which said energy absorption means comprises elastic fluid compression means disposed in said fluid supply conduit means.

6. The apparatus of claim 1 in which said second passageway means of said heat exchange element means is disposed in said fluid supply conduit means.

7. The apparatus of claim 1 for gaseous working fluid having entrained therein a condensable fluid in vapor condition, the system further comprising separator means disposed in said fluid supply conduit means downstream from said second passageway means of said heat exchange element means to separate and collect in said separator means the condensable fluid condensed in said second passageway means.

8. An elastic fluid conditioning system defining a flow path for elastic working fluid from a source thereof to a point of use comprising:
(a) first heat exchange means defining first and second passageway means thereof and arranged for heat exchange between the fluids therein,
both said first and second passageway means being disposed in the working fluid flow path with said first passageway means intermediate said second passageway means and the point of use;
(b) second heat exchange means defining third and fourth passageway means thereof and arranged for heat exchange between the fluids therein,
both said third and fourth passageway means being disposed in the working fluid flow path with said third passageway means disposed intermediate said first and second passageway means, and said fourth passageway means disposed intermediate the working fluid source and said second passageway means;
(c) elastic fluid energy extraction engine means in the working fluid flow path disposed intermediate the working fluid source and said first passageway means,
said elastic fluid energy extraction engine means comprising:
(i) elastic fluid expansion turbine means disposed in the working fluid flow path intermediate said third passageway means of said second heat exchange means and said first passageway means of said first heat exchange means and having shaft power output means; and
(ii) elastic fluid compression means coupled to said shaft power output means to absorb the energy extracted from the working fluid by said elastic fluid expansion turbine means, said elastic fluid compression means being disposed in the working fluid flow path intermediate the working fluid source and said fourth passageway means of said second heat exchange means; and
(d) bypass duct means coupled to the inlet and outlet of said first passageway means to bypass at least a portion of the working fluid around said first passageway.

9. The system of claim 8 further comprising heater means disposed adjacent the inlet end of said first passageway means of said first heat exchange means, said heater means defining tubular passageway means having working fluid inlet means coupled with the working fluid source upstream of said elastic fluid expansion turbine means.

10. The system of claims 8 or 9 in which said bypass duct means is disposed to form a part of, and integral with, said first heat exchange means.

11. The system of claims 8 or 9 in which said first heat exchange means comprises first and second heat exchange element means defining said first and second passageway means, and said bypass duct means is disposed intermediate said heat exchange element means to form a part of, and integral with, said first heat exchange means.

12. The system of claims 8 or 9 in which said bypass duct means is formed such that fluid flow capacity thereof is less than the fluid flow capacity of said first passageway means of said first heat exchange means.

13. The system of claims 8 or 9 in which said bypass duct means is formed such that fluid flow capacity thereof is of the order of about one-half that of said first passageway means of said first heat exchange means.

14. The system of claim 9 in which the source of elastic working fluid provides pressurized fluid, the system further comprising:
(a) third heat exchange means defining fifth and sixth passageway means thereof and arranged for heat exchange between the fluids therein,
said fifth passageway means being disposed in the working fluid flow path intermediate the working fluid source and said fourth passageway means of said second heat exchange means;
(b) coolant duct means having one end thereof coupled to a source of coolant fluid,
said sixth passageway means being disposed in the coolant flow path in said coolant duct means; and
(c) fans means coupled to said shaft power output means to absorb at least a portion of the energy extracted from the working fluid by said elastic fluid expansion turbine means, said fan means being disposed in said coolant duct means to assist the movement therethrough of the coolant fluid.

15. The system of claim 14 for working fluid having entrained therein a condensable fluid in vapor condition, the system further comprising:
   (a) separator means disposed in the working fluid flow path intermediate said second passageway means of said first heat exchange means and said third passageway means of said second heat exchange means to separate and collect in said separator means the condensable fluid condensed in said second passageway means;
   (b) spray nozzle means disposed in said coolant duct means upstream of said sixth passageway means of third heat exchange means; and
   (c) pipe means coupling said separator means with said nozzle means to conduct condensed fluid from said separator means to said nozzle means.

16. The system of claim 15 further comprising:
   (a) fourth heat exchange means defining seventh and eighth passageway means thereof and arranged for heat exchange between the fluid therein,
   said seventh passageway means being disposed in the working fluid flow path intermediate the working fluid source and said fifth passageway means of said third heat exchange means, and
   said eighth passageway means being disposed in coolant flow path in said coolant duct means downstream of said sixth passageway means of said third heat exchange means.

17. The system of claims 14, 15 or 16 further comprising fluid flow control means to control the flow of coolant fluid through said coolant duct means.

* * * * *